H. C. STOUFFER.
Earth-Augers.
No. 137,036.  Patented March 18, 1873.
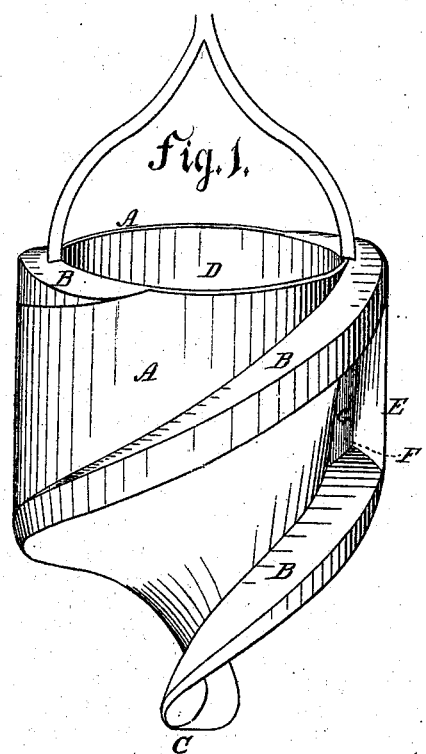
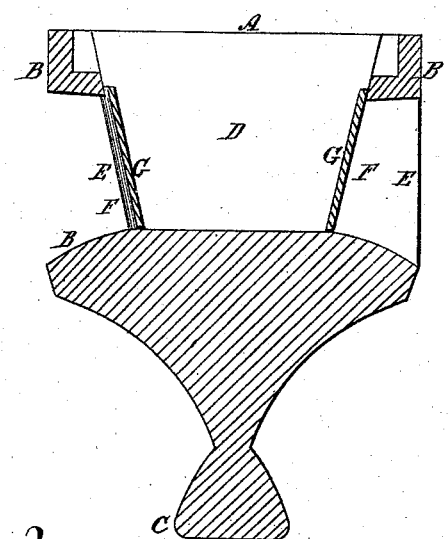
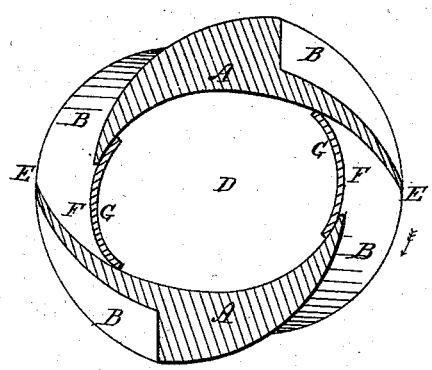
Witnesses:  Inventor:

UNITED STATES PATENT OFFICE.

HIRAM C. STOUFFER, OF CANFIELD, OHIO.

IMPROVEMENT IN EARTH-AUGERS.

Specification forming part of Letters Patent No. 137,036, dated March 18, 1873.

*To all whom it may concern:*

Be it known that I, HIRAM C. STOUFFER, of Canfield, in the county of Mahoning and State of Ohio, have invented certain new and useful Improvements in Earth-Augers, of which the following is a specification:

My invention relates to augers for boring earth; and the improvements which I have made therein consist in the combination of a closed shell having external spiral penetrating threads or ribs with an interior closed receiving-cup and inlet-openings thereto, whereby the earth is collected within a closed chamber by the penetration of the auger and retained therein upon its withdrawal to be emptied; also, in the combination, with an auger having a closed shell, an interior closed receiving-chamber, and external spiral threads, of knives arranged at the entrance of openings in said interior chamber and between the spiral threads of the auger, for the purpose of cutting and directing the cut earth into said closed chamber; and, in combination with an auger having a closed interior receiving-chamber with inlet-openings and external spiral penetrating-threads, of flexible valves arranged to freely admit the earth within the chamber as the auger enters the soil, and to close upon its withdrawal and thus seal the cup and hold the contents therein; the object of said improvements being to produce an auger that will enter the soil freely, feed the loose earth within a closed chamber and hold it until emptied, and to produce such auger from a single casting, rendering it durable, cheap, and effective for the purpose.

In the accompanying drawing, Figure 1 represents a view in perspective of an auger embracing my invention. Fig. 2 represents a vertical section of the same, and Fig. 3 a horizontal section taken through the inlet valved openings of the receiving-cup.

The auger consists of a shell, A, upon the exterior of which threads or ribs B are formed, rising spirally from a cutting entering point, C, and terminating at the top of the shell, within which a cup or chamber, D, is formed, being in depth about half the length of the shell, and of as much area as the latter will admit. This chamber D is open at the top, and a yoke is connected with the shell in any suitable manner, and unites the latter with the operating-stem. The upper portion of the shell is of cylindrical form, and the cup D forms a receptacle for the earth as the auger enters it. Two or more knives, E, are formed in the shell portion between the spiral threads in a plane with their circumference and rising from a level with the bottom of the cup which receives the earth. Opposite to each knife E an opening, F, is formed in the side of the shell, and which, being between the spiral ribs B, affords outlets therefrom for the earth into the cup, while the knives constitute stops to interrupt, direct, and feed the earth within the cup as the auger is turned, in performing which function the knives operate tangentially to the auger-shell, as shown in Fig. 3.

For all practical purposes the interior cup will hold the earth while the auger is being withdrawn, as it is inclosed within the sides of the shell. The inlet-openings F are provided with flexible valves G, secured to the shell on the inside so as to open inward automatically to allow the earth to pass freely from the auger into the cup and to close the opening upon withdrawing the auger, and thus confine the earth therein, which, in very loose or sandy soil is of great advantage in cutting off the running out of the earth as the auger is raised. These valves may be made of any flexible material and arranged as may be best suited for the purpose, so long as they admit of the free entrance of the earth into the cup when the auger is turned, and used in connection with a closed shell.

Having thus described my invention, I claim—

1. In an earth-auger, the combination of a closed shell, A, with encircling spiral ribs or threads B and an interior closed receiving-chamber, D, for the earth, essentially as described.

2. The combination, in an auger having an interior closed chamber, D, and external spiral threads, of knives E, arranged at entrance-openings F of said interior chamber, essentially as and for the purpose described.

3. The combination, with an auger in which the spiral threads encircle an interior earth-receiving chamber having inlet-openings F of flexible valves G, arranged to operate essentially as described.

Witnesses:     HIRAM C. STOUFFER.
J. R. JOHNSTON,
EMORY E. KNOWLTON.